United States Patent [19]
Nettles

[11] 3,742,327
[45] June 26, 1973

[54] PROPORTIONAL MOTOR ACTUATOR CIRCUIT

[75] Inventor: Robert G. Nettles, Goshen, Ind.
[73] Assignee: Johnson Service Company, Milwaukee, Wis.
[22] Filed: Jan. 15, 1971
[21] Appl. No.: 106,650

[52] U.S. Cl................... 318/678, 318/615, 318/683
[51] Int. Cl. ............................................. G05f 1/00
[58] Field of Search................... 318/678, 683, 615, 318/624

[56] References Cited
UNITED STATES PATENTS

| | | | |
|---|---|---|---|
| 3,652,913 | 3/1972 | Leland | 318/678 |
| 3,571,688 | 3/1971 | Tomasulo et al. | 318/681 X |
| 3,391,317 | 7/1968 | Bell | 318/611 |
| 2,821,674 | 1/1958 | Hughes | 318/207 |
| 2,886,642 | 5/1959 | Ehret et al. | 318/616 |
| 3,510,739 | 5/1970 | Peterson | 318/663 X |

*Primary Examiner*—B. Dobeck
*Attorney*—Johnson, Dienner, Enrich, Verbeck & Wagner

[57] ABSTRACT

A motor actuator circuit for use in heating and air conditioning and process control systems to selectively rotate a motor shaft which positions a damper or valve. A command signal, such as a voltage, or a potentiometer controlled by a sensing element of the system provides a signal representing the desired position for the damper and a sense potentiometer provides a signal representing the actual shaft position; a signal comparator circuit including a differential amplifier having an output switching stage is responsive to a potential difference between the signals to effect energization of one of a pair of motor windings, the energized one of the pair being determined by the polarity of the difference signal; and detent circuits derive a detent signal from the voltage across the other one of the motor windings for coupling to the amplifier input to increase the potential difference, the sense potentiometer wiper being linked to the motor shaft so that the potential difference decreases as the shaft rotates to the desired position, and the motor is deenergized when the desired position is reached.

15 Claims, 4 Drawing Figures

INVENTOR
ROBERT G. NETTLES

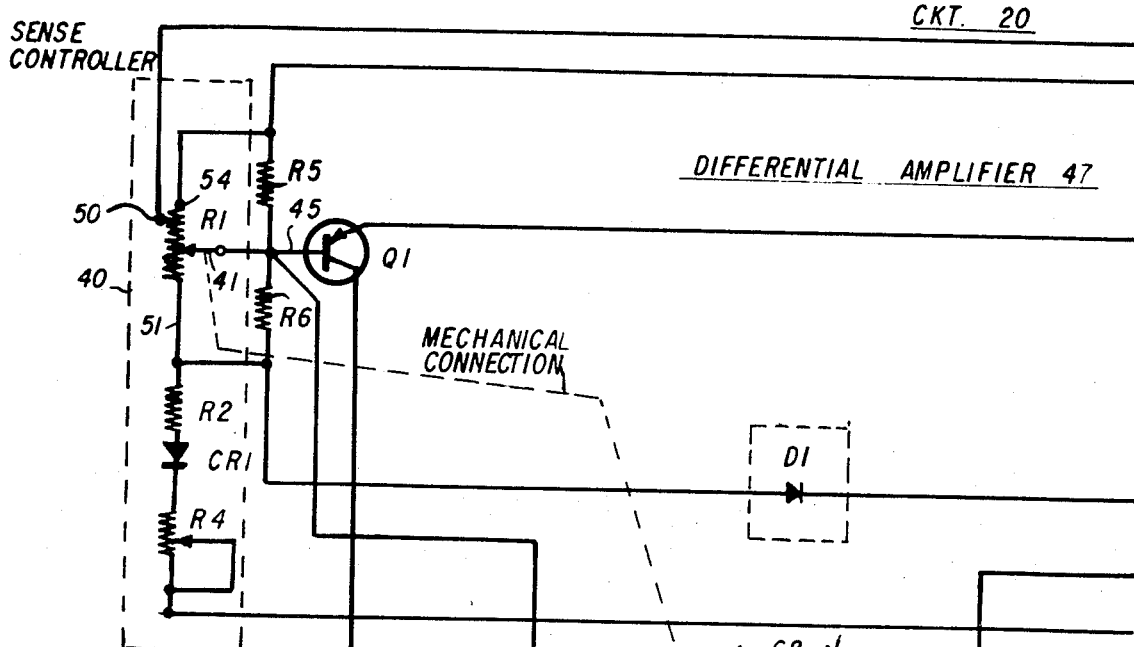
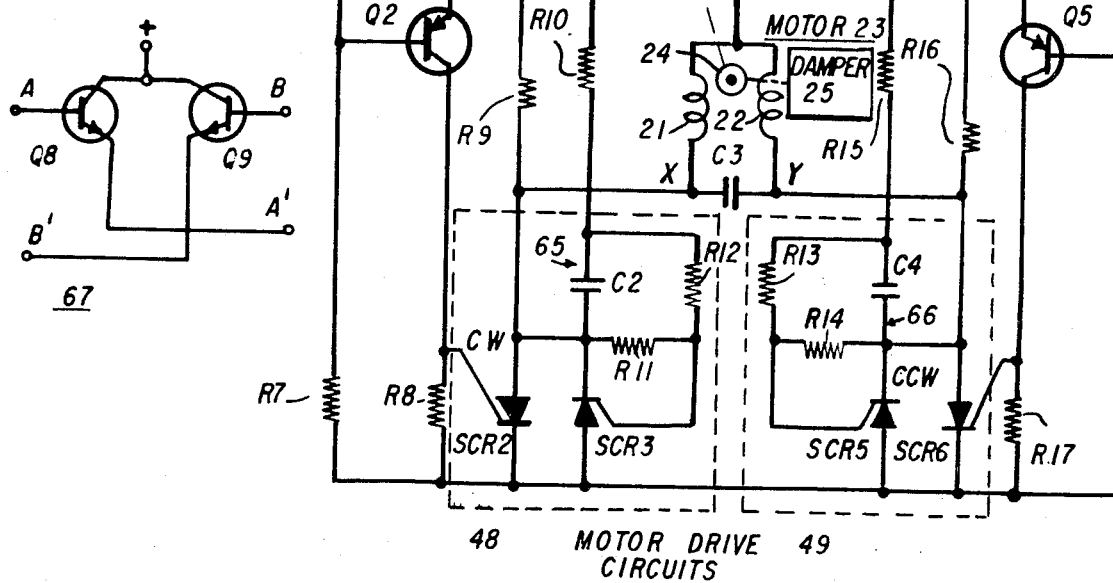
FIG 2
FIG 4

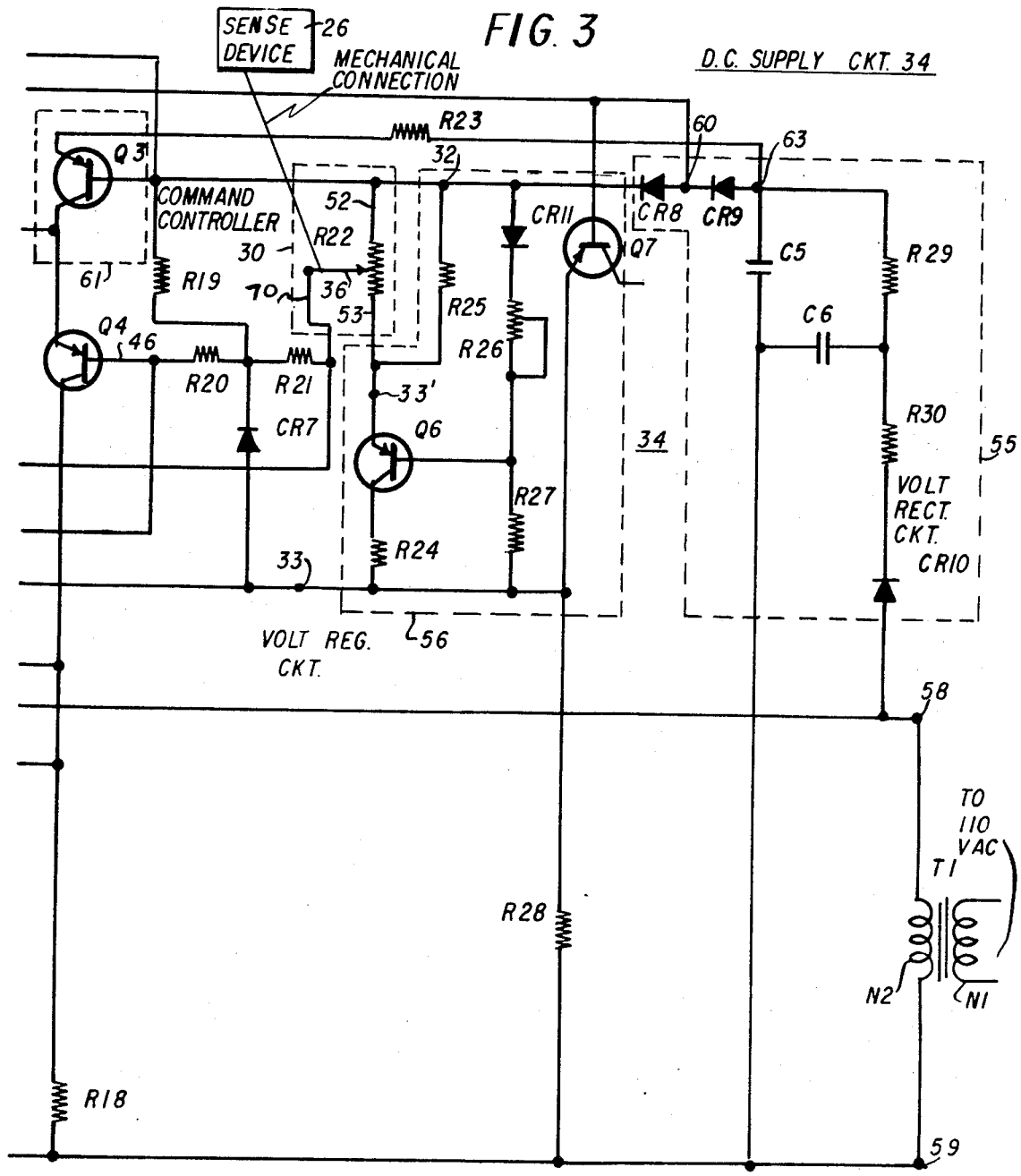

PROPORTIONAL MOTOR ACTUATOR CIRCUIT

BACKGROUND OF THE INVENTION

1. Field of the Invention

This invention relates to analog control circuits, and more particularly, to proportional motor actuator circuits for use in heating, air conditioning and process control systems.

2. Description of the Prior Art

In analog control systems, a monitoring device is used to continuously monitor a physical characteristic of a system and provide an electrical analog signal representing the current value of the characteristic. The signal provided is compared to a signal representing a desired value or set point for the characteristic, and when the compared signals differ by a predetermined amount, an error signal, which is the difference between the signals being compared, controls system apparatus to compensate for the error.

For example, in heating and air conditioning systems, analog signals may be derived through the use of a monitoring device comprising a bimetallic element, a diaphragm, bellows, etc., which continuously monitor the characteristic of the system, such as temperature or steam pressure, and provide analog signals as inputs to a motor actuator circuit for controlling operation of a motor.

The motor shaft is connected to drive a damper located in an air duct, or a valve connected in a hot water or steam line, such that controlled operation of the motor effects changes in the system characteristic being monitored thereby compensating for the error detected.

To provide such compensation, the motor shaft must be rotatable in a clockwise or a counterclockwise direction within a predetermined range, and the error signal must indicate the amount and direction of rotation needed to move the shaft and correspondingly a damper or valve to a desired setting. Accordingly, some prior art motor actuator circuits have used electromechanical balance relays which sense both the amplitude and phase or polarity of the analog signal provided by the monitoring device and control the energization of the motor winding via relay contacts. However, switching thereby the large inductive currents required to energize the motor winding causes undesirable arcing and burning at the contacts. Moreover, control circuits employing relays are subject to line fluctuations and power dissipation in the relay coil.

Solid state switching circuits provided for motor control purposes to avoid disadvantages caused by mechanical contacts and power dissipation are more expensive than electrical mechanical relays they replace. Moreover, these circuits are generally more susceptible to line voltage variations and have the further disadvantage of requiring a large heat sink for the solid state switching elements used in the circuits.

SUMMARY OF THE INVENTION

The present invention provides a motor control circuit including solid state switching elements for selectively energizing windings of a two phase motor to rotate the motor shaft to a desired position in accordance with a command provided by a monitoring device which indicates the desired position for the shaft.

The control circuit comprises an error sensing network including command means responsive to the command to provide a command signal representing the desired position of the shaft, position sense means providing a sense signal representing the actual position of the shaft, and comparator means for comparing the sense signal and the command signal to determine the direction and amount of rotation required to move the motor shaft to the desired position. When the shaft is in the desired position, the sense signal and the command signal provided to the comparator means are equal and the motor windings are not energized. On the other hand, when the shaft is not at the desired position, the sense and command signals are not equal and the comparator means accordingly provides a control signal for enabling drive circuits, controlled by the comparator means, to effect clockwise or counterclockwise rotation of the motor shaft to the desired position.

The position sense means are controlled by the motor shaft to provide a signal that is proportional to the shaft position such that once the motor is energized, the shaft will be rotated until the sense signal is equal to the command signal at which time the motor will be deenergized.

In accordance with one feature of the invention, when one of the motor windings is energized, a detent signal derived from the potential across the other motor winding is provided to the comparator means to enhance inequality between the command and sense signals. Accordingly, once a drive circuit is enabled by the comparator means to energize one of the motor windings, the detent signal causes the enabled drive circuit to be "locked on" until the sense signal equalizes both the change in the command signal and the detent signal thereby assuring compensation for the error indicated by the change in the command signal.

In one embodiment for a motor control circuit provided by the present invention, the command controller means and the sense controller means comprise first and second potentiometers connected in parallel across outputs of a D.C. voltage source forming a bridge circuit, the output of which is taken from the wipers of the command potentiometer and sense potentiometers. The D.C. potential at the wiper of the command potentiometer represents the desired position for the shaft and the D.C. potential at the wiper of the sense potentiometer represents the actual position of the shaft.

A novel comparator means comprising a D.C. differential amplifier has a first input connected to the wiper of the command potentiometer and a second input connected to the wiper of the sense potentiometer. In a balanced condition, that is when the shaft is in the desired position, the signals input to the differential amplifier are equal and in an unbalanced condition, when the shaft is not in the desired position, one of the inputs to the differential amplifier will be greater than the other input. An inherent feature of the differential amplifier comparator means is that one of the input signals must exceed the other in a predetermined amount before the motor drive will be energized.

The differential amplifier further comprises an output stage including first and second output switching transistors inversely connected to the input stage transistors such that when one of the input signals to the amplifier is greater than the other input signal, one output transistor is forward biased and the other output transistor is reversed biased. A drive circuit associated with the forward biased transistor will be enabled to effect energization of one of the windings of the motor and the drive circuit associated with the reverse biased transistor will be disabled.

Thus, when the amplitude of the command signal is greater than the amplitude of the sense signal, one drive circuit will be enabled to effect energization of one of the windings, and when the amplitude of the command signal is less than the amplitude of the sense signal, the other drive circuit will be enabled to effect energization of the other motor winding.

The wiper of the command potentiometer is mechanically coupled to monitoring means which positions the wiper as a function of a monitored variable.

The wiper of the sense potentiometer is mechanically coupled to the motor shaft and is moved by the motor shaft as a function of the position of the shaft. Thus, movement of the command controller wiper causes energization of one of the motor windings effecting movement of the wiper of the sense potentiometer, the motor winding being energized until the wiper of the sense potentiometer has been moved sufficiently to overcome the change in potential at the controller potentiometer resulting from the command monitoring device.

Detent feed back means are connected between one of the windings and a first input of the differential amplifier, and further detent feed back means are connected between the other winding of the motor and the second input of the differential amplifier to provide the desired detent signal whenever one of the motor windings is energized.

A further feature of the novel motor actuator circuit is that means are provided to assure that the sense potentiometer can provide a sense signal to the differential amplifier which will compensate for unbalance conditions caused by movement of the controller potentiometer. Thus, mechanical limit switches are not necessary to prevent the controller potentiometer from causing the feed back potentiometer to be driven to its resistance limits.

In accordance with a further feature of the invention, the motor control circuit includes adjustable travel limit means for the controller permitting adjustment of the amplitude of the sense signal such that the wiper of the sense controller potentiometer, which is driven directly by the motor shaft, is required to travel, for example, only one-third of its range to provide the sense signal required to balance a change in the command signal.

Another feature of the invention is that over-signal clamping means are provided to assure that the sense controller potentiometer will have a slightly greater signal than the input signal provided by the command controller potentiometer so that a balance can be obtained in the event of a short circuit or an overload condition occurring in the motor actuator circuit.

BRIEF DESCRIPTION OF THE DRAWINGS

FIGS. 2 and 3 which when assembled in side by side relationship illustrate a schematic circuit diagram of the motor actuator circuit shown in block form in FIG. 1; and FIG. 4 is a schematic circuit diagram of a circuit for connection into the actuator circuit shown in FIGS. 2 and 3 providing an alternative embodiment for the differential amplifier of the actuator circuit.

DESCRIPTION OF PREFERRED EMBODIMENTS

General Description

Figure 1:
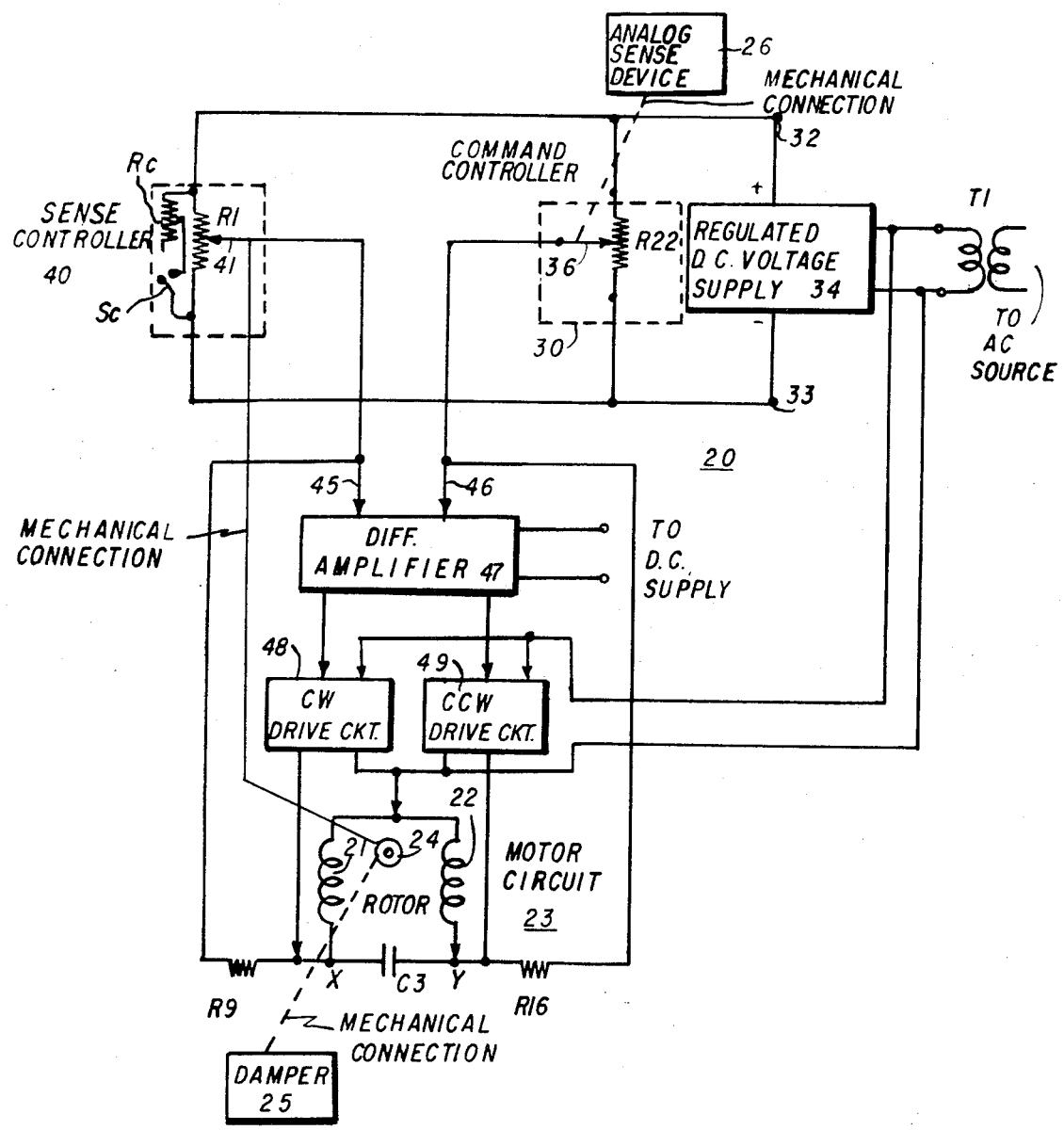
FIG. 1 is a block diagram of a motor actuator circuit provided by the present invention.

A block diagram of a motor actuator circuit 20 provided by the present invention is shown in FIG. 1. As there shown, the actuator circuit 20 is used to effect selective energization of windings 21 and 22 of a motor 23 to rotate the shaft or rotor 24 of the motor to a desired position.

For example, in a temperature conditioning system the motor may provide controlled positioning of a damper 25, driven by the motor shaft 24, as a function of a command provided to the motor actuator circuit 20 by way of an analog sensing device 26 which monitors the temperature at one location within the temperature conditioning system.

The motor actuator circuit employs D.C. sensing to compare signals provided by command controller means 30 and sense controller means 40 to effect positioning of the motor shaft.

In FIG. 1, command controller means 30 controlled by analog sensing means 26 include a potentiometer R22 connected between the output terminals 32 and 33 of a regulated D.C. voltage source 34 which derives a D.C. voltage from a 60Hz, 110 volt A.C. power line coupled through transformer T1. The wiper 36 of potentiometer R22 is mechanically connected to the sensing device 26 and movable thereby such that the D.C. potential at wiper 36 of the command potentiometer R22 represents the desired position of the motor shaft 24 which position is a function of the temperature monitored by the analog sensing device 26.

Shaft position sensing controller means 40 includes sense potentiometer R1 connected between the output terminals 32 and 33 of the voltage source 34 in parallel with the command controller means 30. The wiper 41 of feedback potentiometer R1 is mechanically connected to the motor shaft 24 and movable thereby such that the D.C. voltage at wiper 41 represents the actual position of the motor shaft 24 (and the position of the damper 25 driven by the motor shaft).

The wipers 41 and 36 of potentiometers R1 and R22, respectively, are extended to inputs 45 and 46 of comparator circuit means comprising a novel D.C. differential amplifier 47 so that the potentials representing the actual shaft position (wiper 41) and the desired shaft position (wiper 36) can be compared. When the potentials at amplifier inputs 45 and 46 are equal, the shaft is in the desired position. When the potentials at amplifier inputs 45 and 46 are not equal due to movement of wiper 36 of the command potentiometer by the sensing device 26, and the potential difference between the voltages at inputs 45 and 46 is in excess of a predetermined threshold value, the differential amplifier will provide an enabling signal for drive circuit 48 which is operable when enabled to effect energization of motor winding 21 and provide clockwise rotation of the shaft 24, or for drive circuit 49 which is operable when enabled to effect energization of motor winding 22 and provide counterclockwise rotation of the shaft. The direction of rotation required to move the shaft toward the desired position is determined by the differential amplifier 47 which senses the polarity of the potential difference appearing between inputs 45 and 46 of the amplifier.

The motor shaft 24 rotates so long as the windings 21, 22 are energized through a drive circuit and as the shaft rotates, wiper 41 of the sense potentiometer R1 is moved, causing the potential at wiper 41 and correspondingly at input 45 of the amplifier to increase or decrease. If, for example, the potential at wiper 36 of the command potentiometer (and at input 46 of the differential amplifier) is increased until the potential difference between amplifier inputs 45 and 46 exceeds the threshold, an enabling signal will be provided by the amplifier 47 for enabling drive circuit 49 to effect energization of winding 22 with 24 volt A.C., while winding 21 is placed in series with capacitor C3 in parallel with winding 22. So long as drive circuit 49 remains enabled, the shaft 24 will rotate counterclockwise moving the damper 25 to compensate for the change indicated by the sensing device 26, and moving the wiper 41 of sense potentiometer R1 so that the potential at wiper 41 (and at input 45) will be increased as the shaft is rotated, until the potential difference between amplifier inputs 45 and 46 is less than the threshold value. At such time, the drive circuit enabling signal will no longer be provided by the differential amplifier 47 and the energized motor windings 22, 21 will be deenergized.

Detent means including resistor R9 connected between winding 21 and amplifier input 45 and resistor R16 connected between winding 22 and amplifier input 46 provide a detent signal for increasing the potential difference between amplifier inputs 45 and 46 whenever the windings 21, 22 are energized. For example, whenever winding 21 is energized, the voltage appearing across the other winding 22 is fed back over resistor R16 to input 46 of the amplifier 47. Consequently, the sense signal provided by the sense controller 40 must overcome both the change in potential provided by the command controller 30 and the detent signal before the potential difference between amplifier inputs 45 and 46 becomes less than the threshold value. A more complete description of the operation of the motor actuator circuit and more particularly of the novel signal comparator means 47 and detent features of the invention are set forth in the following detailed description.

Detailed Description of Preferred Embodiments

Referring to the detailed circuit schematic diagram of the actuator circuit shown in FIGS. 2 and 3, the sense controller means includes a sense potentiometer R1 having a tap 50 connected to output terminal 32 of a D.C. voltage supply 34 and a terminal 51 connected over a resistor R2, a diode CR1 and a travel limit adjust potentiometer R4 to output terminal 33 of the voltage supply 34. The command controller means 30 includes a command potentiometer R22 having a terminal 52 connected to supply output terminal 32 and a terminal 53 connected to supply output terminal 33'.

As shown in FIG. 3, the D.C. supply 34 includes a voltage rectifier circuit 55 which provides a halfwave rectified D.C. voltage between output terminals 32 and 33 of the D.C. voltage supply. The D.C. voltage is derived from a 110 volt, 60 Hz signal coupled to the motor actuator circuit through an input transformer T1 which has a primary winding N1 connected to an A.C. source. The secondary winding N2 of transformer T1 has one end at terminal 58 connected over a unidirectional current path of the voltage rectifier circuit 55 comprising rectifier diode CR10, a filter network including current limiting resistors R29, R30 and filter capacitors C5, C6 and diodes CR8, CR9 to output terminal 32. The other end of winding N2 at terminal 59 is connected over resistor R28 to output terminal 33.

The D.C. supply 34 further comprises a voltage regulation circuit including transistors Q7 and Q6. The base of transistor Q7 is connected at point 60 to terminal 54 of sense potentiometer R1 and through diode CR8 to output terminal 32 of the voltage supply, and the emitter of transistor Q7 is connected to terminal 33. Transistor Q7 acts as a Zener diode to provide a stabilized voltage +V across output terminals 32 and 33 which voltage appears across the sense controller means 40. Transistor Q6 and associated bias resistors R24–R27 provide further regulation for the rectified D.C. voltage and also connect one end of the command potentiometer R22 at terminal 33' to output terminal 33 of the voltage supply, so that only, say, one-third of the regulated output voltage +V appears across the command controller potentiometer R22. It should be noted that command controller 30 provides the input command signal to the actuator circuit and may be remotely located therefrom. In fact, all that is required is a controller which provides an input D.C. signal across terminals 32 and 70.

Signal Comparator Circuit

The amplitudes of the D.C. sense signal provided at the wiper 41 of feed back potentiometer R1 and the D.C. command signal provided at wiper 36 of the command potentiometer R22 are compared by the D.C. differential amplifier 47. The differential amplifier includes an input stage including transistors Q1 and Q4, both biased to be normally conducting, and an output stage including output switching transistors Q2 and Q5, both normally turned off. The switching of transistors Q2 and Q5 is controlled by transistors Q1 and Q4 as a function of the potential present at the differential inputs 45, 46 of the amplifier 47.

The base of transistor Q1, which serves as one input 45 to the amplifier, is connected to wiper 41 of the feed back potentiometer R1, and over bias resistor R5 to the D.C. supply 34 at point 60. The collector of transistor Q1 is connected through resistor R7 to terminal 59.

The base of transistor Q4 which serves as a second input 46 to the differential amplifier 47 is connected through resistors R20 and R21 to wiper 36 of command potentiometer R22 and over bias resistor R19 to terminal 32 of the voltage source 34. The collector of transistor Q4 is connected through resistor R18 to terminal 59.

The emitters of transistors Q1 and Q4 are connected to the collector of transistor Q3 which comprises a constant current source 61 for supplying emitter current to the emitters of transistors Q1 and Q4. The base of transistor Q3 is connected to terminal 32 of the voltage source, and the emitter of transistor Q3 is connected over resistor R23 to the point 63 of the power supply circuit 34 such that forward bias is provided for the transistor Q3 by diodes CR8 and CR9.

When the input voltages supplied by the sense and command controllers are equal, transistors Q1 and Q4 will share the current from the current source 61 equally and the voltages at the collectors of transistors Q1 and Q4 will be equal. However, when the input voltages are unequal, current division, and consequently the collector voltages, are unequal so that a differential voltage proportional to the difference in the input voltage exists between the collectors of transistors Q1 and Q4. This differential voltage is applied to the base-emitter circuits of transistors Q2 and Q5 which circuits are reversely connected between the collectors of transistors Q1 and Q4 such that when the voltage at the collector of transistors Q1 is more positive than the voltage at the collector of transistor Q4 (by an amount exceeding the minimum turnon voltage Vbe min. of transistors Q2 and Q5) and the base-emitter circuit of transistor Q5 which is connected between the collector of transistor Q4 and the collector of transistor Q1 is forward biased, and the base-emitter circuit of transistor Q2 which is connected between the collector of transistor Q2 and the collector of transistor Q4 is reverse biased. In such case, transistor Q5 would be turned on and transistor Q2 would remain turned off.

Conversely, if the voltage at the collector of transistors Q1 is negative relative to the collector of transistor Q4, the base emitter circuit of transistor Q5 would be reverse biased and the base emitter circuit of transistor Q2 would be forward biased.

Motor Drive Circuits

Whenever transistor Q2 is forward biased, an enabling signal is provided at the collector of transistor Q2 to enable output drive circuit 48 comprised of silicon controlled rectifiers SCR2 and SCR3 which, when triggered on, connect the motor winding 21 between terminals 58 and 59 for energization by A.C. currents provided over transformer T1. The switching devices SCR2 and SCR3 are connected in inverse parallel to permit full wave conduction of the energizing A.C. signals.

One end of motor winding 21 is connected directly to terminal 58 and the other end of winding 21 is connected over the anode cathode circuit of SCR2 to terminal 59. The gate of SCR2 is connected to the collector of output transistor Q2 for receiving an enabling gate signal therefrom for triggering the SCR2 into conduction. When enabled, SCR2 conducts during the positive half of cycles of the power signals permitting A.C. current to flow from terminal 58 through winding 22 and SCR2 to terminal 59. The second switching device SCR3 has its anode-cathode circuit connected in inverse parallel with SCR2 for conducting the A.C. current during negative half cycles of the power signal. The gate signal for SCR3, for turning SCR3 on during the negative half cycles of the power signal is provided by a timing network 65 connected to the gate of SCR3, including resistors R10-R12 and capacitor C2 which network is connected in parallel with winding 21 such that capacitor C2 charges during each positive half cycle of the power signal, and discharges as SCR2 becomes cut off by the negative going power signal, triggering SCR3 into conduction.

The drive circuit 49 controlled by output switching transistor Q5 for effecting energization of winding 22 is similar to drive circuit 48 and includes inverse connected silicon controlled rectifiers SCR5 and SCR6, respectively operable when enabled to connect one end of motor winding 22 to terminal 59 during alternate half cycles of the power signal, the other end of the winding being connected to terminal 58. The gate of SCR6 is connected to the collector of output transistor Q5 for receiving an enabling gate signal therefrom, and the gate of switching device SCR5 is connected to a timing network 66 comprising a capacitor C4 and resistors R13-R15 which provides a gate signal for SCR5. It is pointed out that SCR6 (or SCR2) is enabled to energize winding 22 (or 21) directly and winding 21 (22) over capacitor C3 only at the concurrent presence of a gate drive signal and a positive anode-cathode voltage.

The motor 23 used is a commercially available 24 VAC single phase permanent split capacitor motor. A capacitor C3 is connected between windings 21 and 22 of the motor to provide the required phase shift for operation of the motor on a single phase signal.

One end of winding 21 is connected through detent resistor R9 to the base of transistor Q1 at the sense input 45 of the differential amplifier to provide a detent signal whenever winding 22 is energized, which as will be shown hereinafter serves to maintain SCR5 and SCR6 conducting long enough to assure rotation of the shaft, particularly when the potential difference at the amplifier input is small.

Similarly, one end of winding 22 is connected through detent resistor R16 to the base of transistor Q4, the command input 46 of the differential amplifier for providing a detent signal whenever winding 21 is energized.

Operation of the Motor Actuator Circuit

With reference to FIGS. 2 and 3, when the motor shaft 24 is at the desired position the actuator circuit is in a balanced condition and the sense signal provided to the base of transistor Q1 by the sense controller 40 is approximately equal to the command signal provided to the base of transistors Q4 by the command controller 30, the potential difference between the bases of transistors Q1 and Q4 is insufficient to cause either transistor Q2 or Q5 to be forward biased. Under such condition, the motor winding drive circuits 48 and 49 are not enabled, and the motor is not energized.

When a change in temperature is sensed by the analog sensing device 26, the wiper 36 of the command controller potentiometer R22 is moved an amount corresponding to the temperature change causing an increase or a decrease in the potential at wiper 36 of potentiometer R22. This change in potential indicates the direction of rotation and the amount of rotation required for the shaft to position the damper 25 to correspond to the temperature change.

It is pointed out that the voltage at wiper 36 is negative with respect to the voltage at terminal 32. Thus, if the wiper 36 is moved to increase the potential between wiper 36 and terminal 32, the potential at wiper 36 will become more negative. Accordingly, the potential at the base of transistor Q4 will become more negative so that transistor Q4 will conduct more emitter current than will transistor Q1, and the collector voltage of transistor Q4 will be greater than the collector voltage of transistor Q1. When the potential difference between the collectors of transistors Q4 and Q1 exceed Vbe minimum of transistor Q2, transistor Q2 will be forward biased and transistor Q5 will be reverse biased.

When transistor Q2 is forward biased, collector current of transistor Q2 will trigger SCR2 of drive circuit 48 into conduction so that winding 21 of the motor is connected in a circuit path including the motor winding 21 and the secondary winding N2 of the input transformer T1 and the anode to cathode circuit of SCR2 for energization by the A.C. signals provided over transformer T1 during the positive half cycles of the A.C. power signals. During the positive half cycles of the power signal, capacitor C2 connected in parallel with resistors R11 and R12, is charged by current flowing over the series circuit comprising resistors R10–R12; connected in parallel with winding 21.

A second energizing path for winding 21 is provided over the anode to cathode circuit of SCR3 and winding N2 during the negative half cycles of the A.C. power signal, when SCR3 is triggered as capacitor C2 discharges over resistors R11, R12.

The silicon controlled rectifiers SCR2 and SCR3 of drive circuit 48 will be energized during positive and negative half cycles of the power signal, respectively, as long as output switching transistor Q2 is enabled to provide gate current for SCR2.

When clockwise winding 21 of the motor is energized responsive to the enabling of drive circuit 48, the motor shaft 24 will be moved clockwise as long as the winding 21 is energized. As the shaft moves clockwise toward the desired position as indicated by the potential at wiper 36 of command potentiometer R22, wiper 41 of the sense controller potentiometer R1 which is mechanically linked to the shaft 24 will also be moved in a direction to compensate for the error indicated by the setting of the command controller potentiometer R22. Thus, while the shaft 24 is rotated clockwise to position the damper 25 as required to compensate for the change in system conditions, the potential provided at the base of transistor Q1 by the wiper 41 of sense potentiometer R1 will approach the potential at the base of transistor Q4 provided by the command potentiometer R22. When the potential difference between the collectors of transistors Q4 and Q1 decreases below Vbe min. of transistor Q2 the actuator circuit will be in a balanced condition, and output transistor Q2 will be cut off such that enabling gate current will no longer be supplied to SCR2 of drive circuit 48, and clockwise winding 21 will be deenergized.

The motor 23, shown schematically in FIG. 2, runs on a single phase voltage provided from the A.C. source over transformer T1 and extended to windings 21 or 22 of the motor via switching devices, SCR2, SCR3, and SCR5, SCR6, respectively. The motor capacitor C3 is switched in series with either winding 21 or 22 depending upon whether drive circuit 49 or 48 is enabled. When the motor is running, both windings 21 and 22 and the capacitor C3 are energized, but the circuit path which includes the capacitor C3 and one of the motor windings is nearly at series resonance. The voltage across these reactive components is greater than the applied voltage and also shifted in phase.

In the present illustration in which the clockwise winding 21 is energized by the drive circuit 48, the voltage across the other winding 22 is approximately two-thirds greater than the voltage applied to the clockwise winding 21. This voltage provides the detent signal feed back to the inputs 45, 46 of the differential amplifier 47 to enhance the unbalance caused by an error detection as indicated by the command controller 30. Feedback is provided to both inputs 45, 46, and the detent signal is the difference in amplitude of the induced voltage from that of the 24 volt line.

Thus, in the exemplary illustration, a portion of the induced voltage appearing across the counterclockwise winding 22 is fed back as detent signal via resistor R16 to the base of transistor Q4, while a lesser portion of the voltage across winding 21 is fed back via resistor R9 to the base of transistor Q1.

The path for the detent signal provided (when clockwise winding 21 is energized through drive circuit 48) extends from SCRs 2 and 3, through capacitor C3, one end of winding 22 over resistor R16 to the base of transistor Q4 and through transistor Q3 in parallel with resistors R20 and R19 and through voltage rectifier circuit 55 to terminal 58 of secondary winding N2 of transformer T1 and thence to the other end of the motor winding 22.

The detent signal drives the base of transistor Q4 further negative, relative to the base of transistor Q1 thereby increasing the potential difference between the bases of transistors Q1 and Q4 and correspondingly the potential difference between the collectors of transistors Q1 and Q4. It is pointed out that the value of resistor R16 is large relative to resistors R20 and R28 such that the detent voltage is on the order of ten to fifteen millivolts which is comparable to the threshold voltage of the differential amplifier 47 which is approximately twenty millivolts. The detent signal is A.C. on both adds and subtracts from the potential at the bases of transistors Q1 and Q4.

Accordingly, once SCR2 and SCR 3 of drive circuit 48 are rendered conducting responsive to an enabling signal provided by transistor Q2, the detent signal will assure that the shaft 24 will be rotated enough to compensate for the change in the setting of the command potentiometer R22 and the actuator circuit will prevent "hunting" by the motor for a balanced condition for the actuator circuit.

When the motor winding 21 is energized, the shaft will rotate clockwise toward the desired position moving the wiper 41 of the sense potentiometer to decrease the potential at the base of transistor Q1 so that the potential at the base of transistor Q1 will approach the potential at the base of transistor Q4 and the potential difference between the collectors of transistors Q1 and Q4 will approach zero.

The output transistor Q2 will be cut off when the potential difference at the input to the amplifier is decreased to a value to cause the potential difference between collectors of transistor Q1 and Q4 to be less than the value of Vbe min. for transistor Q2, whereby transistor Q2 is cut off, effecting deenergization of the winding 21 and stopping rotation of the shaft 24 and further movement of the wiper 41 of the sense potentiometer R1. The detent signal is not provided when winding 21 is deenergized.

The operation of the motor actuator circuit to provide counterclockwise rotation of the shaft is similar to the operation of the actuator circuit to provide clockwise shaft rotation. If the opposite command signal is provided by the command controller 30, the potential at the base of transistor Q4 becomes more positive than the potential at the base of transistor Q1 so that the potential difference between the collectors of transistors Q1 and Q4 effects reverse biasing of transistor Q2 and forward biasing of transistor Q5. Accordingly, drive circuit 49 will be enabled by collector current provided by transistor Q5, rendering SCR5 and SCR6 conductive during alternate half cycles of the power signal, to connect winging 22 of the motor between terminals 58 and 59 for energization by the A.C. power signals. Detent signals derived from the voltages appearing across the motor windings 21 and 22 are fed back over resistors R9 and R16 to the bases of transistors Q1 and Q4 in a fashion similar to that described in the foregoing.

At the time when the A.C. line is positive with respect to terminal 59, the base-to-emitter voltage of transistor Q1 (the potential between input 45 and source output terminal 32) is increased due to the detent voltage derived across winding 21 and fed back to transistor Q1 to aid in turning SCR6 on for an additional full A.C. cycle.

When winding 22 is energized by the drive circuit 49, the motor shaft will be rotated clockwise, moving the wiper 41 of feed back potentiometer R1 to provide a feed back signal for increasing the potential at the base of transistor Q1 until the potential difference between the bases of transistors Q1 and Q4 is decreased below the threshold value of the differential amplifier 47 at which time the drive circuit 49 is disabled and motor winding 22 deenergized.

MODIFICATIONS

Over-Signal Clamping

Diode D1, connected between terminal 51 of the sense potentiometer R1 and wiper 36 of the command potentiometer R22, provides a means for varying the reference point for potentiometer R1 relative to the voltage source terminal such that whenever the potential at wiper 36 relative to terminal 51 exceeds the voltage required to forward bias the diode D1, diode D1 conducts so that the excess voltage is applied across R1 and adds to the voltage supplied by the Zener source Q7 between terminals 54 and 51 of the sense potentiometer.

Travel Limit Adjust

The travel limit adjust potentiometer R4 which is connected in series with the sense controller potentiometer R1 permits motor shaft rotation over an angular range of 90° to 270°. The maximum value of variable resistance element R4 is twice the maximum value of the sense resistance element R1. Whenever potentiometer R4 is set at maximum resistance, the voltage across sense potentiometer R1 is approximately one-third of the voltage across the Zener device Q7 and the motor shaft must rotate 270° to provide a sense signal which offsets the command and detent signals. If the value of resistance R4 is zero, the full Zener supply, which is three times he maximum voltage available to the command controller potentiometer R22, appears across R1 and the motor shaft need rotate only one-third of the 270° range to provide a null.

Switching Transistor Drive Circuit

FIG. 4 shows an intermediate amplifier stage 67, comprising transistors Q8 and Q9, for differential amplifier 47 which comprises the comparator means. The amplifier circuit 67 has terminals A,A' and B,B' connectable to correspondingly labeled points of the differential amplifier circuit which are shown in FIG. 2 to be interconnected by links 68 and 69.

When the intermediate stage 67 is connected into the amplifier circuit 47, transistor Q8 has its base-emitter circuit connected in place of link 68 between the collector of transistor Q1 and the emitter of transistor Q5, and transistor Q9 has its base-emitter circuit connected in place of link 69 between the collector of transistor Q4 and the emitter of transistor Q2. The collectors of transistors Q8 and Q9 are connected to the positive terminal 32 of the voltage source.

When a positive potential difference exists between the collectors of transistors Q1 and Q4, transistors Q8 and Q5 will be forward biased and transistors Q9 and Q2 reverse biased. When such potential difference is negative, transistors Q9 and Q2 will be forward biased and transistors Q8 and Q5 will be reversed biased.

With the intermediate stage 67, the differential amplifier 47 provides a higher value output control signal since the input stage furnishes only the base drive current for the output transistors Q2 and Q5. The collector current for the output transistors Q2 and Q5 is provided by the intermediate stage 67.

External Controllers

Several motor actuator circuits can be slaved from one command input means, such as command controller 30. In addition, the D.C. supply voltage provided between terminal 32 and terminal 59 can be used to energize external controllers requiring an unregulated supply voltage.

It is pointed out that an externally generated command signal provided by a command input means can be applied to the motor actuator circuit across terminals 70 and 32 by connecting the output of a variety of suitable controllers, such as a differential transformer or operational amplifier output, in place of the output of the controller potentiometer R22. In fact, all that is required is that a D.C. input command signal be provided by suitable command input means across terminals 70 and 32 of the activate control circuits.

The differential transformer will be controlled by a sensing device, such as device 26, to provide an output representing the desired positions for the shaft.

Input Signal Characterizer

In certain installations, the device positioned by the motor shaft may have non-linear operating characteristics. For example, if the damper 25 were a valve, a linear change in the command input signal provided by the sensing device 26 would effect a linear change in the valve set point. However, a linear change in the valve set point would not provide a correspondingly linear change in the flow rate through the valve.

Therefore, as shown in FIG. 1, an adjustable characterizing resistor Rc is shown connected in series with an enabling switch Sc across the sense controller potentiometer R1 permitting linearization of the valve operating characteristic.

Thus, when switch Sc is closed to connect the characterizing resistance Rc in parallel with the sense potentiometer R1, the value of resistance Rc can be adjusted to cause the control circuit to provide nonlinear changes in shaft position in response to a linearly changing command input signal, thereby compensating for the non-linear characteristic of the valve positioned by the motor and providing a linear change in flow rate for a linear change in the command input signal provided by the sensing device 26.

I claim:

1. In a motor control circuit for effecting selective energization of first and second windings of a motor to rotate the motor shaft to a desired position, command means for providing a command input signal representing the desired position for said shaft, sense controller means for providing a sense signal representing the actual position of said shaft, comparator means having first and second inputs for receiving said command and sense signals, respectively, said comparator means being responsive to a change in said command signal relative to said sense signal to effect the energization of aid first and second windings selectively to cause rotation of said shaft in a direction toward said desired position, and detent means for extending first and second detent signals derived from said first and second windings to the first and second inputs, respectively, of said comparator means whenever said windings are energized to increase the difference between said command and sense signals supplied to the first and second inputs of said comparator means.

2. A motor control circuit as set forth in claim 1 wherein said sense controller means includes signal characterizing means operable when enabled to modify said sense signal whereby a linear change in said command input signal effects non-linear change in the shaft position.

3. A motor control circuit as set forth in claim 2 wherein said sense controller means includes first potentiometer means and said signal characterizing means includes adjustable resistor means and means for connecting said adjustable resistor means in parallel with said first potentiometer means.

4. In a motor control circuit for effecting selective energization of first and second windings of a motor to rotate the motor shaft to a desired position, command input means for providing a command input signal representing the desired position for said shaft, sense controller means for providing a sense signal representing the actual position of said shaft, comparator means responsive to a difference in the amplitudes of said signals to effect energization of said windings to rotate said shaft in a direction toward the desired position, and detent means including first circuit means connected between one of said motor windings and said command input means to provide a detent signal to said command input means whenever said windings are energized and second circuit means connected between the other of said motor windings and said sense controller means to provide a detent signal to said sense controller means whenever said windings are energized, to thereby increase the potential difference between said command and sense signals supplied to said comparator means.

5. A motor control circuit as set forth in claim 3 wherein said comparator means includes first output means enabled whenever said command signal increases a predetermined amount relative to said sense signal to energize said windings to effect rotation of the shaft in one direction, and second output means enabled whenever said command signal decreases a predetermined amount relative to said sense signal to energize said windings to effect rotation of said shaft in the opposite direction.

6. A motor control circuit as set forth in claim 3 including over-signal clamping means connected between said sense controller means and said command input means.

7. In a motor control circuit for effecting selective energization of first and second windings of a motor to rotate the motor shaft to a desired position, command controller means for providing a command signal representing the desired position for the shaft, sense controller means for providing a sense signal representing the actual position of the shaft, comparator means including switching means operable whenever said command and sense signals differ by a given amount to provide an output signal, the polarity of the output signal being different as the command signal increases or decreases relative to the sense signal, first drive means responsive to an output signal of one polarity to energize said windings to effect rotation of the shaft in one direction and second drive means responsive to an output signal of a second polarity to energize said windings to effect rotation of the shaft in the opposite direction , and detent means including first circuit means connected to provide a first detent signal derived from said first winding to said command controller means whenever said windings are energized, and second circuit means connected to provide a second detent signal derived from said second winding to said sense controller means whenever said windings are energized, said first and second detent signals being coupled to said command and sense controller means , respectively, to increase the difference between said command and sense signals, said sense controller means being controlled by said motor shaft such that as said shaft rotates towards said desired position, the amplitude of the sense signal approaches the amplitude of the command signal, to thereby decrease the difference between said command and sense signals below said given amount and effect deenergization of said windings.

8. A motor control circuit as set forth in claim 6 wherein said command controller means includes first potentiometer means connected across output terminals of a voltage source for providing said command signal at a wiper of said first potentiometer means and wherein said sense controller means includes second potentiometer means connected across said source output terminals for providing said sense signal at a wiper of said second potentiometer means.

9. A motor control circuit as set forth in claim 8 wherein said first circuit means comprise resistance means connected between said first winding and said first potentiometer wiper to couple said detent signal to said first potentiometer wiper whenever said second winding is energized, and said second circuit means comprise second resistance means connected between said second winding and said second potentiometer wiper to couple said detent signal to said potentiometer wiper whenever said first winding is energized.

10. A motor control circuit as set forth in claim 8 including diode means connected between said resistance means of said first circuit means and a terminal of said second potentiometer means for assuring that a sense signal greater in amplitude than the command signal can always be obtained.

11. A motor control circuit as set forth in claim 6 wherein said command controller means includes first potentiometer means connected across a pair of output terminals of a voltage source which provide a first potential across said command controller means, and said sense controller means includes second potentiometer means and limit potentiometer means serially connected across a further pair of output terminals of said source which provide a second potential across said sense controller means, said limit potentiometer means being adjustable to vary the potential across said second potentiometer means between said first potential and said second potential.

12. In a motor control circuit for effecting selective energization of first and second windings of a motor to rotate the motor shaft to a desired position, command controller means for providing a command signal of an amplitude representing the desired position for the shaft, sense controller means for providing a sense signal of an amplitude representing the actual position of the shaft, comparator means including switching means operable whenever the amplitudes of the command and sense signals differ by a given amount to provide an output signal, the polarity of the output signal being different as the command signal increases or decreases relative to the sense signal, first drive means enabled responsive to an output signal of one polarity to effect energization of said windings to effect rotation of the shaft in one direction and second drive means enabled responsive to an output signal of a second polarity to effect energization of said windings to effect rotation of the shaft in the opposite direction and detent means including first circuit means connected between one of said windings and said command controller means to provide a first detent signal derived from said one winding whenever said windings are energized and second circuit means connected between the other of said windings and said sense controller means to provide a second detent signal derived from said other winding whenever said windings are energized, said first and second detent signals being coupled to said command and sense controller means, respectively to increase the difference between said command and sense signals, said sense controller means being controlled by said motor shaft such that as said shaft rotates towards said desired position, the amplitude of the sense signal approaches the amplitude of the command signal decreasing the difference between the amplitude of said command and sense signals below said given amount to thereby effect deenergization of said windings.

13. In a motor control circuit for effecting selective energization of first and second windings of a motor to rotate the motor shaft to a desired position, command controller means for providing a command signal representing the desired position for the shaft, sense controller means for providing a sense signal representing the actual position of the shaft, comparator means including a first input transistor having an input electrode connected to said sense controller means to receive said sense signal and a first control electrode, a second input transistor having an input electrode connected to said command controller means to receive said command signal and a second control electrode, a first switching transistor having a first input electrode connected to said first control electrode and a second input electrode connected to said second control electrode, and a second switching transistor having a first input electrode connected to said second control electrode and a second input electrode connected to said first control electrode, and means forward biasing said first switching transistor and reverse biasing said second switching transistor to provide an output signal of a first polarity whenever the amplitude of the command signal exceeds the amplitude of the sense signal by a predetermined amount of reverse biasing said first switching transistor and forward biasing said second switching transistor to provide an output signal of the opposite polarity whenever the amplitude of the sense signal exceeds the amplitude of the command signal by said predetermined amount, first drive means responsive to one of said output signals to energize said windings to effect rotation of said shaft in one direction, second drive means responsive to the other one of said output signals to energize said windings to effect rotation of said shaft in the opposite direction, and detent means including first circuit means connected to provide a first detent signal derived from one of said windings to said command controller means and second circuit means connected to provide a second detent signal derived from the other of said windings to said sense controller means, said first and second detent signals being coupled to said command and sense controller means, respectively to thereby increase the difference in amplitude between said command and sense signals.

14. A motor control circuit for effecting selective energization of first and second windings of a motor to rotate the shaft to a desired position, said motor control circuit comprising command input mans for providing a first signal representing the desired position for the shaft, sense controller means for providing a second signal representing the actual position of the shaft, signal comparator means including input means responsive to a difference in said first and second signals to provide a potential difference of a first or a second polarity between first and second output which indicates an increase or a decrease in the first signal relative to said second signal, and output means with first and second switching means having control circuits reversely connected between said first and second outputs such that when the potential difference between said outputs is one polarity, said first switching means is enabled and said second switching means is disabled to provide a first output signal, and when the potential difference between said outputs is of a second polarity, said second switching means is enabled and said first switching means is disabled to provide a second output signal, first drive means responsive to said first output signal to effect energization of one of said motor windings, and a second drive means responsive to said second output signal to effect energization of the other of said motor windings, and detent means including first circuit means connected between one of said motor windings and said sense controller means for coupling a detent signal derived from said one windings to said sense controller means whenever said windings are energized and second circuit means connected between the other one of said motor windings and said command input means for coupling a further detent signal derived from said other motor winding to said command input means whenever said windings are energized to thereby increase the difference between said command and sense signals.

15. In a motor control circuit for effecting selective energization of first and second windings of a motor to rotate the motor shaft to a desired position, signal comparator means, command means for supplying a command signal representing the desired position for said shaft to an input of said comparator means, sense controller means for supplying a sense signal representing the actual position of said shaft to a further input of said comparator means, said comparator means being responsive to a change in said command signal relative to said sense signal to selectively energize said windings to cause rotation of said shaft in a direction toward said desired position, and signal characterizing means connected to said sense controller means and operable when enabled to modify the sense signal provided by said sense controller means whereby a linear change in said command signal relative to said sense signal effects a non-linear change in the position of said motor shaft.

\* \* \* \* \*